(12) United States Patent
Aykac et al.

(10) Patent No.: US 8,624,193 B2
(45) Date of Patent: Jan. 7, 2014

(54) TIMING RESPONSE IMPROVEMENT IN LIGHT-SHARING DETECTORS

(71) Applicant: Siemens Medical Solutions USA, Inc., Malvern, PA (US)

(72) Inventors: Mehmet Aykac, Knoxville, TN (US); Michael Loope, Louisville, TN (US); Mark Musrock, Oak Ridge, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 13/666,001

(22) Filed: Nov. 1, 2012

(65) Prior Publication Data

US 2013/0056639 A1    Mar. 7, 2013

Related U.S. Application Data

(62) Division of application No. 12/558,475, filed on Sep. 11, 2009, now Pat. No. 8,330,112.

(60) Provisional application No. 61/096,018, filed on Sep. 11, 2008.

(51) Int. Cl.
*G01T 1/20* (2006.01)

(52) U.S. Cl.
USPC .................................................... 250/363.09

(58) Field of Classification Search
USPC .................................................... 250/363.09
See application file for complete search history.

(56) References Cited

U.S. PATENT DOCUMENTS

| | | | |
|---|---|---|---|
| 6,376,841 B1 * | 4/2002 | Petrillo et al. | 250/363.03 |
| 6,858,847 B1 | 2/2005 | Macciocchi | |
| 2005/0109958 A1 * | 5/2005 | Vernon | 250/526 |
| 2006/0163486 A1 * | 7/2006 | Laurence et al. | 250/363.04 |

FOREIGN PATENT DOCUMENTS

WO    WO 2008023451 A1 *  2/2008

* cited by examiner

*Primary Examiner* — David Porta
*Assistant Examiner* — Shun Lee
(74) *Attorney, Agent, or Firm* — Peter Kendall

(57) ABSTRACT

A method for improving timing response in light-sharing scintillation detectors is disclosed. The method includes detecting an event, by a plurality of photo sensors, from a scintillation crystal. The method then includes sampling and digitizing the photo sensor outputs by an analog-to-digital converter. Then the method includes correcting associated timing data, by a processor, for each of the photo sensor outputs based on a lookup table. The method then includes selectively time shifting the photo sensor outputs based on the lookup table to generate corrected photo sensor outputs. The method then includes summing the corrected photo sensor outputs by the processor. The method then includes generating an event time, by the processor, for the detected event based on the sum of the corrected photo sensor outputs.

7 Claims, 5 Drawing Sheets

| 450.1 | 400.4 | 372.8 | 399.5 | 415.9 | 435.9 | 437.2 | 495.2 | 423.9 | 430.6 | 471 | 467 |
|---|---|---|---|---|---|---|---|---|---|---|---|
| 468.8 | 407.5 | 395.7 | 394.1 | 431.8 | 457.9 | 438.2 | 435.1 | 421.9 | 428.6 | 493 | 491.4 |
| 416 | 407.7 | 413.2 | 408 | 514.9 | 465.4 | 443.7 | 418.7 | 429.9 | 426.2 | 430.7 | 447.2 |
| 414 | 405.4 | 399.1 | 394.5 | 443.2 | 505.3 | 411.4 | 456.8 | 406 | 424.9 | 419.1 | 442.9 |
| 401.6 | 411.4 | 411.5 | 424.7 | 445.1 | 435 | 473.9 | 436.9 | 409.8 | 416.6 | 431.8 | 427.4 |
| 411.1 | 443.6 | 445.3 | 401.2 | 499.9 | 491.9 | 418.8 | 473.9 | 427.7 | 427.6 | 451.2 | 426 |
| 440.8 | 446.7 | 453.3 | 421.5 | 478.2 | 467.2 | 446 | 479.2 | 442.5 | 441.7 | 440.8 | 460.6 |
| 447.3 | 439.6 | 437 | 456.2 | 474.5 | 435.3 | 505.4 | 544.6 | 416.7 | 422.9 | 415.9 | 436.6 |
| 439.9 | 438.5 | 437.8 | 436.1 | 434.6 | 531.4 | 438 | 497.4 | 437.2 | 420.7 | 415.7 | 446.9 |
| 431.1 | 442.3 | 441.6 | 436.7 | 492.3 | 443.7 | 441.6 | 435.3 | 437.5 | 447.5 | 432.1 | 548.9 |
| 450.7 | 448.7 | 437.8 | 439 | 439.3 | 440.5 | 434.2 | 456.5 | 465.4 | 455.2 | 427 | 429.1 |
| 445.9 | 455.7 | 448.3 | 451.7 | 439.1 | 438.3 | 440.5 | 472.5 | 540.8 | 447 | 447.1 | 456.9 |

AVE: 443ps:

FIG. 7

| 426.5 | 443.6 | 431.3 | 443.5 | 406.7 | 407.8 | 399.4 | 457.7 | 411 | 437.1 | 453.2 | 453.5 |
|---|---|---|---|---|---|---|---|---|---|---|---|
| 451.2 | 440.2 | 430.2 | 423.6 | 419.7 | 436.2 | 415.3 | 421.7 | 435.4 | 422.2 | 430.5 | 440.4 |
| 417.1 | 436 | 387 | 406.6 | 488.3 | 409.5 | 394.2 | 424.1 | 427 | 416.6 | 434.2 | 416.3 |
| 392.8 | 420.9 | 407.5 | 400.9 | 430.7 | 463.9 | 424.5 | 436.9 | 412.8 | 417.7 | 443.4 | 430.3 |
| 399.8 | 430.6 | 412.1 | 404.2 | 403.5 | 416.2 | 462.5 | 436.4 | 431.3 | 418.6 | 431.6 | 432.6 |
| 406.2 | 416.7 | 399.5 | 391.5 | 467.5 | 462 | 407.5 | 481.3 | 435.3 | 418.1 | 402.7 | 424.1 |
| 423 | 429 | 412.1 | 415.5 | 464.8 | 477.2 | 430.3 | 500.6 | 412.2 | 420 | 415.2 | 409.9 |
| 441.5 | 433.4 | 418.9 | 450 | 478 | 404.5 | 492.7 | 514.1 | 423.6 | 398.3 | 415.1 | 440.5 |
| 407.5 | 396.3 | 415.5 | 412.5 | 416 | 511 | 425.4 | 481.4 | 398.9 | 415.3 | 404.5 | 427.8 |
| 423.2 | 435.1 | 416.5 | 402.5 | 438.7 | 436.5 | 412.8 | 406.1 | 402.4 | 425.5 | 416.1 | 483.8 |
| 453.7 | 449.4 | 417.1 | 396.2 | 418.1 | 416.9 | 434.4 | 406 | 438.1 | 410.6 | 419.4 | 445.7 |
| 446.6 | 465.2 | 423.7 | 435.3 | 424 | 438.1 | 454.1 | 416.9 | 520.4 | 432.4 | 415.6 | 433 |

AVE: 429ps

FIG. 8

TIMING RESPONSE IMPROVEMENT IN LIGHT-SHARING DETECTORS

CROSS REFERENCES TO RELATED APPLICATIONS

This application is a divisional application of U.S. patent application Ser. No. 12/558,475 filed on Sep. 11, 2009, the disclosure of which is incorporated by reference in its entirety

TECHNICAL FIELD

In general, the present disclosure relates to nuclear medical imaging. More particularly, the disclosure relates to Positron Emission Tomography (PET) imaging and improving timing of events detected by photomultiplier tubes.

BACKGROUND

Nuclear medicine is a unique specialty wherein radiation emission is used to acquire images that show the function and physiology of organs, bones or tissues of the body. The technique of acquiring nuclear medicine images entails first introducing radiopharmaceuticals into the body—either by injection or ingestion. These radiopharmaceuticals are attracted to specific organs, bones, or tissues of interest. Upon arriving at their specified area of interest, the radiopharmaceuticals produce gamma photon emissions, which emanate from the body and then are captured by a scintillation crystal. The interaction of the gamma photons with the scintillation crystal produces flashes of light, which are referred to as "events." Events are detected by an array of photo detectors (such as photomultiplier tubes), and their spatial locations or positions are then calculated and stored. In this way, an image of the organ or tissue under study is created from detection of the distribution of the radioisotopes in the body.

One particular nuclear medicine imaging technique is known as positron emission tomography, or PET. PET is used to produce images for diagnosing the biochemistry or physiology of a specific organ, tumor or other metabolically active site. The measurement of tissue concentration using a positron emitting radionuclide is based on coincidence detection of the two gamma photons arising from a positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors; i.e., the gamma photon emissions are detected virtually simultaneously by each detector. When two oppositely disposed gamma photons each strike an oppositely disposed detector to produce a time coincidence event, they also identify a line-of-response (LOR) along which the annihilation event has occurred. An example of a PET method and apparatus is described in U.S. Pat. No. 6,858,847, assigned to Siemens Medical Solutions USA, Inc., which patent is incorporated herein by reference in its entirety.

Timing information is one factor in the quality of coincidence imaging such as positron emission tomography (PET). Analog constant fraction discriminators (CFD) are used traditionally to determine timing pickoff for PET scanners. In order to achieve good image quality, time-of-flight PET requires 500 ps or less time resolution.

SUMMARY

A technology to facilitate improved timing response in light-sharing scintillation detectors by time shifting data associated with photomultiplier tubes (or similar devices) are disclosed. Methods of the technology include detecting an event, by a plurality of photo sensors, from a scintillation crystal; sampling and digitizing the photo sensor outputs at a defined frequency; time shifting data associated with the detected event, by a processor, for each of the photo sensor outputs based on a lookup table to generate aligned photo sensor outputs; summing the aligned photo sensor outputs by the processor; and generating an event time, by the processor, for the detected event based on the sum of the aligned photo sensor outputs.

BRIEF DESCRIPTION OF THE DRAWINGS

FIG. 7 illustrates a spreadsheet with Crystal time resolution values for a 13×13 LSO array for unmatched PMTs in accordance with an exemplary embodiment;

FIG. 8 illustrates a spreadsheet with Crystal time resolution values for a 13×13 LSO array for matched PMTs in accordance with an exemplary embodiment;

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology. The functions described as performed at various components can be performed at other components, and the various components can be combined and/or separated. Other modifications also can be made. Thus, the following disclosure describes systems, computer readable media, devices, and methods for improving timing of events detected by photomultiplier tubes. Many other examples and other characteristics will become apparent from the following description.

As described above, radiopharmaceuticals that are injected into or ingested by a patient produce gamma photon emissions that emanate from the patient's body and are then captured by one or more scintillation crystals. The interaction of the gamma photons with the scintillation crystals produces flashes of light, which are referred to as "events." Events are detected by an array of photo detectors (such as photomultiplier tubes), and their spatial locations or positions are then calculated and stored. In this way, an image of the organ or tissue under study is created from detection of the distribution of the radioisotopes in the body.

When a gamma interaction occurs within a scintillator crystal, a scintillation light, or event, is produced within that particular crystal. A plurality of photo sensors, such as photomultiplier tubes (PMTs), at each scintillator crystal detects these light events and generate signals that represent voltage over time. A detected event will cause each of the four PMTs to generate an output signal. The output signals of all four PMTs are summed. The summed signal of all four PMTs is analyzed, for example by a time to digital converter, such as a constant fraction discriminator (CFD), and an event time is generated for each event based on the sum of the individual phototdetector (PMT) signals by the time to digital converter. The time to digital converter can output the time of arrival in digital form for each received signal.

Figure 1:
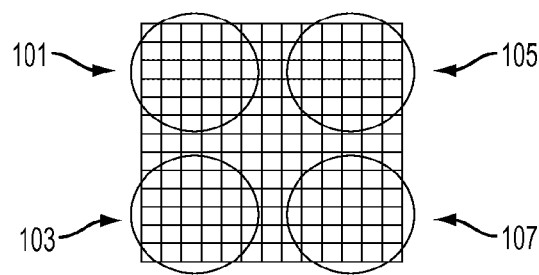
FIG. 1 illustrates a top view of a Lutetium Oxyorthosilicate (LSO) scintillator crystal on four PMTs in accordance with an exemplary embodiment.

FIG. 1 shows a Lutetium Oxyorthosilicate (LSO) scintillator crystal on four PMTs (an array of four PMTs). As the scintillation crystal captures gamma photon emissions, the crystal produces flashes of light that are referred to as events. The four PMT tubes will detect light events produced by the scintillator crystal.

Figure 2:
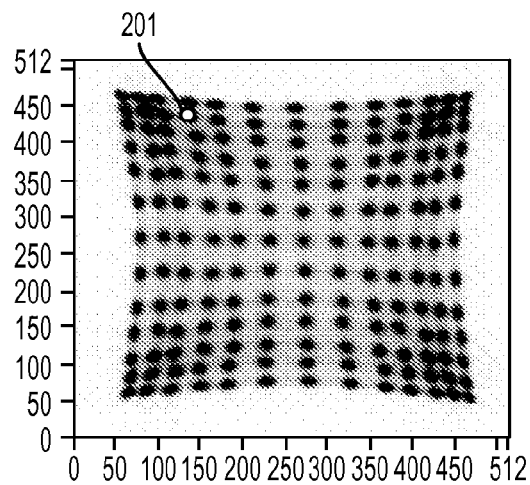
FIG. 2 illustrates a screenshot of on acquired position profile using four PMT signals in accordance with an exemplary embodiment.

FIG. 2 is an illustration of on acquired position profile using four PMT signals. The four PMTs from FIG. 1 can overlap the crystal of FIG. 2, and the four PMTs can capture the event 201 as shown. The time for the event 201 from FIG. 2 to reach each one of the four PMTs as shown in FIG. 1 will vary because the distance between the event and each PMT differs. As shown, the event is closest in distance to PMT-1 101 and therefore the event causes a change in voltage at PMT-1 101 the soonest in comparison with other PMTs. The event is next closest in distance to PMT-0 105 and the therefore causes a change in voltage at PMT-0 next in time. The event is third closest in distance to PMT-3 103 and therefore causes a change in voltage at PMT-3 103 next in time. The PMT furthest from the event in distance is PMT-2 107 and therefore the event will cause a change in voltage at this PMT last in time, because the distance between the event and PMT-2 is the greatest of all four PMTs.

Figure 3:
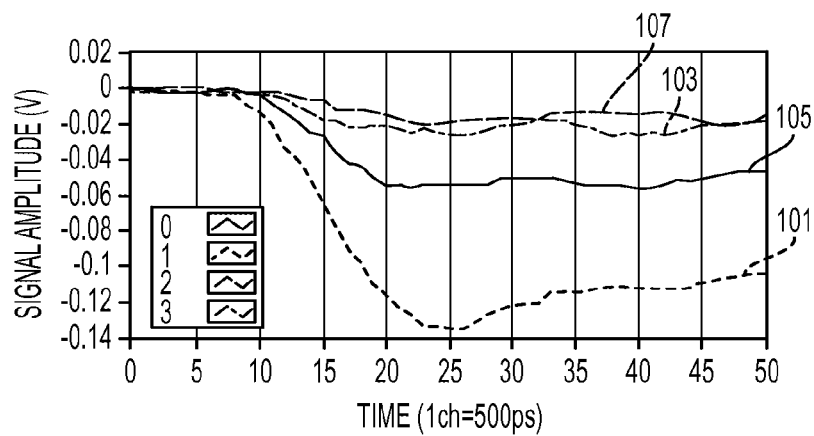
FIG. 3 illustrates a screenshot of a graph of four PMT signals for one event in accordance with an exemplary embodiment.

FIG. 3 is an illustration of a snapshot of four PMT signals for one event as described with reference to FIG. 2. As described above, since the crystal generating the event is closest to PMT-1, the signal amplitude is the largest (absolute value) for PMT 1 compared to the other three PMTs. In addition, the arrival time of the scintillation photons at PMT-1 compared to other PMTs is 1.0-1.5 ns earlier, in this example.

Because of the light sharing in the scintillator array, each photosensor receives a portion of the light from the event. This occurs because different absolute value voltage responses are generated by each PMT as shown in the plot of FIG. 3. The distance between each crystal in the scintillator array and each sensor in the sensor array varies, therefore the intensity and arrival times of the scintillation photons differ. Because of this difference there is a measurable time delay between the signals from each photo sensor as shown in the plot of FIG. 3 as the signal corresponding to each PMT departing from substantially "0" at a different time.

Degradation in the rise time of the total signal, e.g., prolongation over the rise time of any one signal, can occur if the signals from each sensor are not aligned, e.g., remain in their raw state. Because traditional analog constant fraction discriminators do not align the signals before they are summed (a processor can sum the signals from each of the PMTs in an array), there is room to improve the timing response of the overall signal by aligning individual PMT signals to achieve more precise rise time information relative to one another.

Figure 4:
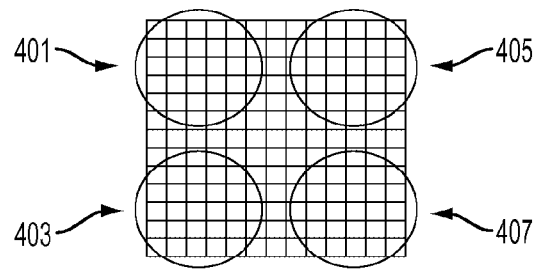
FIG. 4 illustrates a top view of a LSO crystal array on four PMTs in accordance with an exemplary embodiment.
Figure 5:
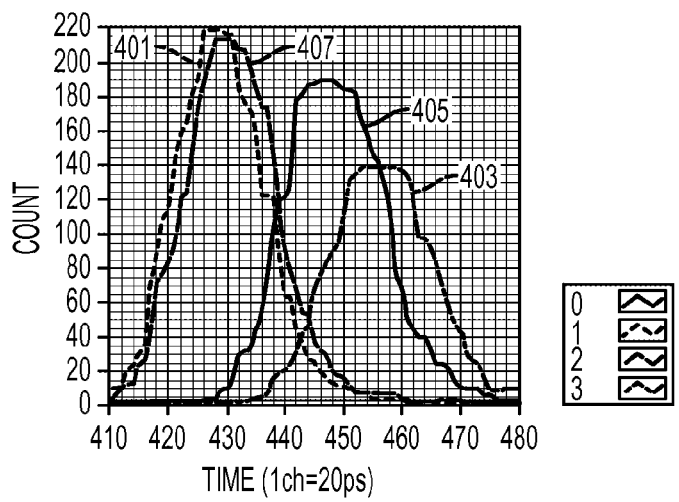
FIG. 5 illustrates a screenshot of a graph of unmatched PMTs by transit time in accordance with an exemplary embodiment.
Figure 6:
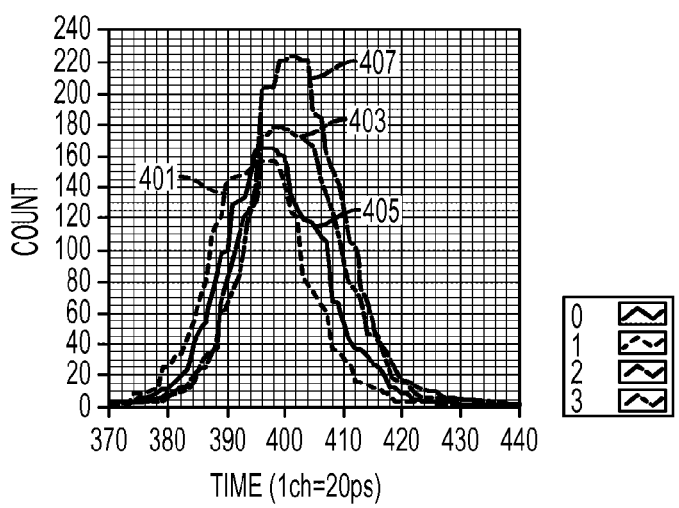
FIG. 6 illustrates a screenshot of a graph of matches PMTs by using delay lines in accordance with an exemplary embodiment.

FIG. 4 illustrates an LSO crystal array on four PMTs. PMT-1 401, PMT-0 403, PMT-3 405 and PMT-2 407 are shown. FIG. 5 illustrates an example of unmatched PMTs by transit time, which is the time needed for an event from a scintillation crystal to reach a particular PMT. FIG. 6 illustrates an example of aligned PMT responses by using delay lines. FIG. 7 illustrates event timing values for a 13×13 LSO array for unmatched PMTs. In FIG. 7 the average value is 443 ps. This average value was measure against a reference PMT with plastic scintillators for an unaligned PMT set.

FIG. 8 illustrates event timing values for a 13×13 LSO array for aligned PMTs. In FIG. 8, the average value is 429 ps. This average value was measured against a reference PMT with plastic scintillators after the PMTs are matched by their transit time. A 15 ps improvement was measured when the same crystal arrangement and the same PMT tube set was used after delay lines were placed.

It has been observed that when the photomultiplier tubes signals are aligned in terms of their timing response (e.g. transit time), then the overall timing data of events relative to each other improves as presented in FIG. 6.

Figure 9:
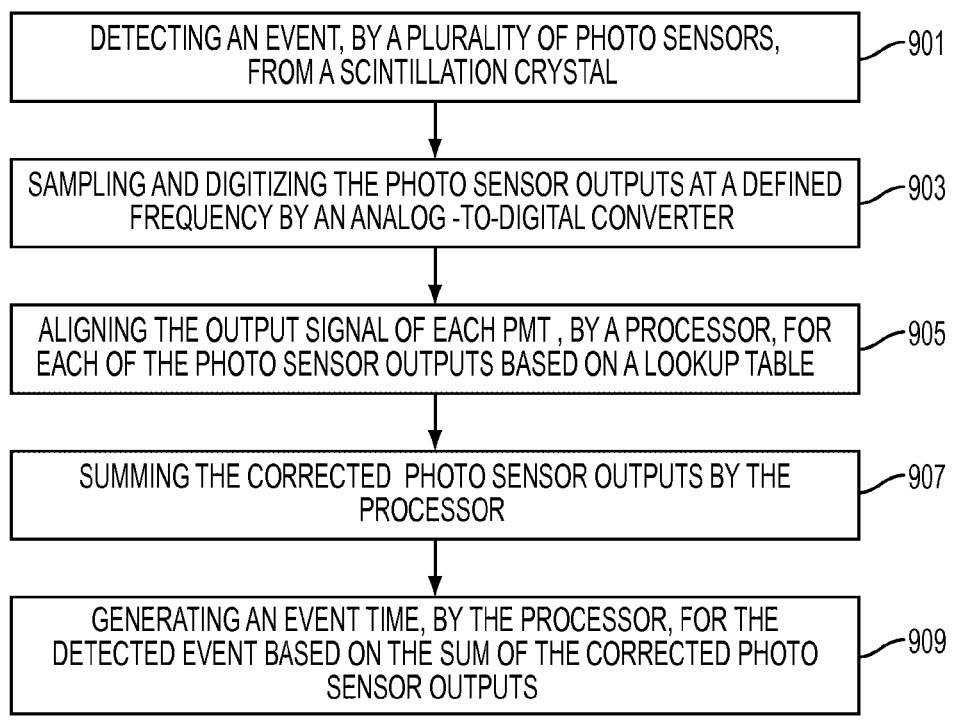
FIG. 9 illustrates a flowchart for improving timing response in light-sharing scintillation detectors in accordance with an exemplary embodiment.

FIG. 9 illustrates a flowchart for improving timing response in light-sharing scintillation detectors. The method includes detecting an event, 901, by a plurality of photo sensors, from a scintillation crystal. The method then includes sampling and digitizing the photo sensor outputs at a defined frequency, 903, by an analog-to-digital converter.

Due to physical characteristics of scintillation photons, a sampling frequency of 200 MHz or higher is preferred. Also, higher frequencies of sampling and digitizing can improve overall timing precision due to Nyquist Theorem limitations.

Then the method includes aligning the output signal of each PMT, 905, by a processor, for each of the photo sensor outputs based on a lookup table. In one example, the lookup table can contain offset values for each PMT. For example, the PMT that generated the highest absolute value voltage based on the detected event can be designated as a reference PMT for the array by the processor. Then, the processor can access the lookup table and apply an offset value using a mathematical operation for each other PMTs in the array in relation to the reference PMT.

The offset value can represent modeled transit times based on which PMT exhibits the strongest response. For example, if the upper left PMT is measured to capture 50% of the photon energy from the event, the upper right and lower left PMTs are each measured to capture 20% of the energy, and the lower right PMT is measured to capture 10% of the energy, then the lookup table can contain 0 ps offset for the upper left PMT, equal delay, e.g., 1 ps offset, for the upper right and lower left PMTs, and greater delay, e.g., 1.5 ps offset for the lower right PMT—each offset based on the delta transit time modeled for that energy distribution among PMTs.

The offset can be applied to each PMT output signal by time shifting each signal an amount corresponding to the offset provided in the table lookup. The offsetted signals can be summed; the summed aligned signals now having a steeper rise than summed unaligned signals. The summed aligned signal can now be timed by an appropriately indexed CFD.

Additionally, the offset in the lookup table can be applied to a timing value associated with each PMT. The timing values of all PMTs in the array can be combined using a mathematical function to derive an overall timing value for the detected event.

The method can include summing the corrected photo sensor outputs, 907, by the processor. The method can include generating an event time 909, by the processor, for the detected event based on the sum of the corrected photo sensor outputs. The processor can generate this time event by utilizing a time to digital converter and generating a timing value upon receiving the summed signal.

In one example, all photo sensor outputs are sampled and digitized at high frequency (200 MHz or larger). Since digitized signals from each crystal will have different arrival times, the signals can be corrected based on a lookup table for each crystal within the array. For example, the processor can apply an offset for each PMT that is not closest in distance to the event. The offset of each PMT signal can be applied to the signal by time shifting. Then, in this example, the corrected signals are summed and a corrected event time is generated for each event based on the sum of the corrected photo detector signals. The processor can generate this corrected time event by utilizing a time to digital converter, such as a constant fraction discriminator, and generating a timing value upon receiving the summed signal.

Figure 10:
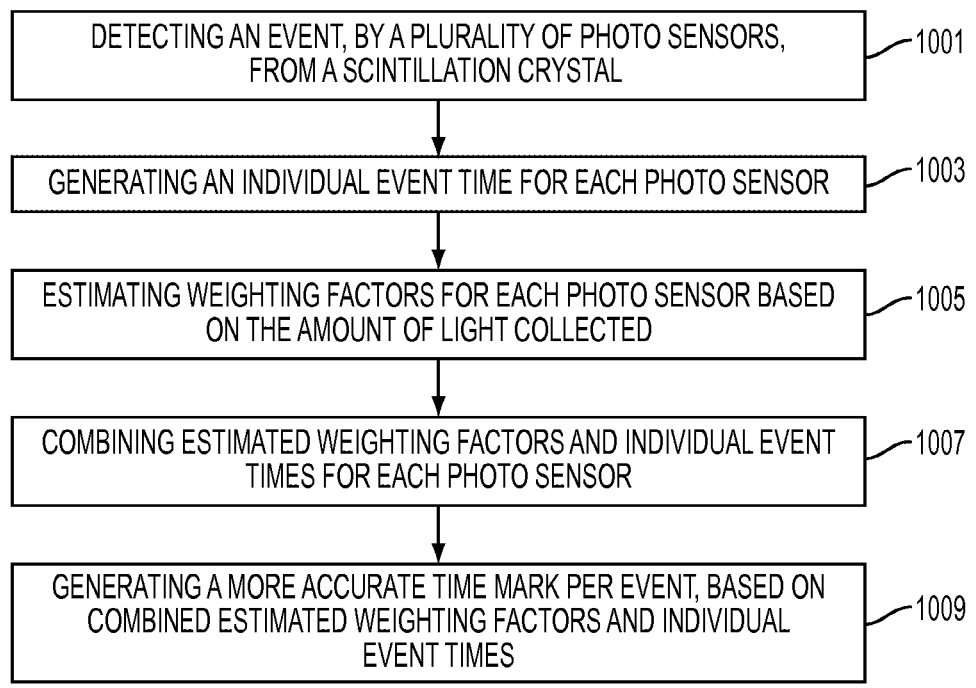
FIG. 10 illustrates a flowchart for improving timing response in light-sharing scintillation detectors in accordance with another exemplary embodiment.

In another example, as shown in FIG. 10, event times can be generated individually 1003 for each sensor and weighting factors can be estimated 1005 for each photo sensor based on the amount of light collected by each individual sensor 1001. Then, estimated weighting factors and individual event times for each sensor can be combined 1007 to generate a more accurate time mark per event 1009. In one example, event times are generated for each sensor by a time to digital converter for each PMT. Then a processor can apply a weighting factor to each event time. The weighting factor function can include addition, subtraction, division, multiplication and other mathematical operations between the event time and offset for a given PMT. The adjusted event times for each PMT can then be combined by a mathematical operation, such as an average or mean, to obtain a final timing value for the detected event. Other functions can be utilized to apply a weighting factor to a given PMT event time. In one example, a higher weighted value is given to a PMT closest in distance to a detected event for timing computation purposes.

An embodiment can include individual digital constant fraction discriminators (CFDs) for each crystal element or more appropriately time-sharing multiple crystals into a smaller set of digital CFDs. Therefore, a digital CFD implementation can generate more accurate timing information using the corrected digital signals.

In some embodiments of the technology, each of the array photo sensor signals is sent to an individual analog CFD circuit and an event time and subsequent timestamp is measured for each individual photosensor. A correction value is applied based on the measured crystal location and a weighted combination of the individual photosensor timestamps inside a processing field programmable gate array (FPGA). A processor can apply this correction value by time shifting the output signal of each PMT and then summing the output signals.

PET systems can take the form of hardware and software elements. In some embodiments, the technology is implemented in a PET system in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A PET data processing system suitable for storing program code and for executing program code will include at least one processor coupled directly or indirectly to memory elements (e.g., computer-readable media) through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Those of ordinary skill may vary the apparatus and methods for improving timing response in light-sharing scintillation detectors without varying from the scope of the invention as defined in the appended claims.

What is claimed is:

1. An apparatus to improve timing response in light-sharing scintillation detectors comprising:
    a plurality of photo sensors to detect events from a plurality of scintillation crystals;
    an analog-to-digital converter to sample and digitize the photo sensor outputs; and
    a processor configured to:
        correct associated timing data for each of the photo sensor outputs based on a lookup table containing a plurality of offset values corresponding to the plurality of photo sensors, each of the plurality of offset values representing modeled transit times based on energy distribution among the plurality of photo sensors;

selectively time shift the photo sensor outputs based on the lookup table to generate corrected photo sensor outputs;

sum the corrected photo sensor outputs; and generate event times for the detected events based on the sum of the corrected photo sensor outputs.

2. The apparatus of claim 1, wherein the sampling frequency is 200 Megahertz or higher.

3. The apparatus of claim 1, wherein each photo sensor output includes an individual digital constant fraction discriminator.

4. The apparatus of claim 1, wherein the photo sensors are photomultiplier tubes.

5. A computer program embodied as computer-executable instructions stored on a non-transitory computer-readable medium for improving timing response in light-sharing scintillation detectors, the program comprising instructions for:

detecting events, by a plurality of photo sensors, from a plurality of scintillation crystals;

sampling and digitizing the photo sensor outputs by an analog-to-digital converter;

correcting associated timing data, by a processor, for each of the photo sensor outputs based on a lookup table containing a plurality of offset values corresponding to the plurality of photo sensors, each of the plurality of offset values representing modeled transit times based on energy distribution among the plurality of photo sensors;

selectively time shifting the photo sensor outputs based on the lookup table to generate corrected photo sensor outputs;

summing the corrected photo sensor outputs by the processor; and generating event times, by the processor, for the detected events based on the sum of the corrected photo sensor outputs.

6. The program of claim 5, wherein the sampling frequency is 200 Megahertz or higher.

7. The program of claim 5, wherein each photo sensor output includes an individual digital constant fraction discriminator.

* * * * *